United States Patent
Banks et al.

(10) Patent No.: US 6,779,251 B2
(45) Date of Patent: Aug. 24, 2004

(54) ASSEMBLY METHOD FOR VEHICLE ANTI-THEFT KEY WITH RESISTOR

(75) Inventors: David C. Banks, Johnson City, TN (US); Charles C. Edwards, Greenville, TN (US)

(73) Assignee: Hurd Corporation, Greenville, TN (US)

( * ) Notice: Subject to any disclaimer, the term of this patent is extended or adjusted under 35 U.S.C. 154(b) by 86 days.

(21) Appl. No.: 10/036,015

(22) Filed: Oct. 29, 2001

(65) Prior Publication Data

US 2003/0079336 A1 May 1, 2003

(51) Int. Cl.[7] ............................................. H01C 17/28
(52) U.S. Cl. .............................. 29/619; 29/530; 29/856; 70/278.2; 264/263; 264/274; 338/67
(58) Field of Search ................................ 29/610.1, 613, 29/619, 460, 530, 855; 264/263, 267, 277, 274; 338/67; 70/278.2, 278.3, 395, 405, 406, 409, 413, 460

(56) References Cited

U.S. PATENT DOCUMENTS

| | | | |
|---|---|---|---|
| 1,438,839 A | * | 12/1922 | Levey ........................ 70/460 |
| 3,518,655 A | | 6/1970 | Saul |
| 3,660,624 A | | 5/1972 | Bell |
| 4,200,227 A | | 4/1980 | Lemelson |
| 4,390,758 A | | 6/1983 | Hendrickson |
| 4,393,672 A | | 7/1983 | Gelhard |
| 4,432,311 A | * | 2/1984 | Holtzberg et al. .......... 264/235 |
| 4,697,171 A | | 9/1987 | Suh |
| 5,083,362 A | | 1/1992 | Edgar et al. |
| 5,156,032 A | | 10/1992 | Edgar |
| 5,433,096 A | | 7/1995 | Janssen et al. |
| 5,605,067 A | | 2/1997 | Juan |

* cited by examiner

*Primary Examiner*—Peter Vo
*Assistant Examiner*—Donghai D. Nguyen
(74) *Attorney, Agent, or Firm*—Luedeka, Neely & Graham, P.C.

(57) ABSTRACT

An assembly method for a vehicle anti-theft key having an embedded resistor pellet is provided. The resistor pellet includes a flange at one end which abuts one side of the key blade when the opposed end of the pellet is inserted into a through opening formed in the shank portion of the key blade. With the resistor pellet loosely positioned within the through opening, a second flange is attached to the end of the pellet that was inserted through the through opening, thereby capturing the pellet within the through opening by the two opposed flanges. In one embodiment, the second flange is formed in place by employing a polymeric molding process, such as a thermoforming injection molding process. A handle for the key is efficiently formed substantially simultaneously with the second flange using the same polymeric molding process.

12 Claims, 4 Drawing Sheets

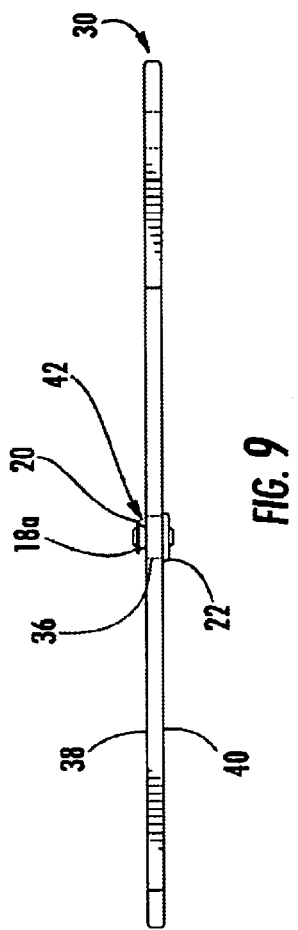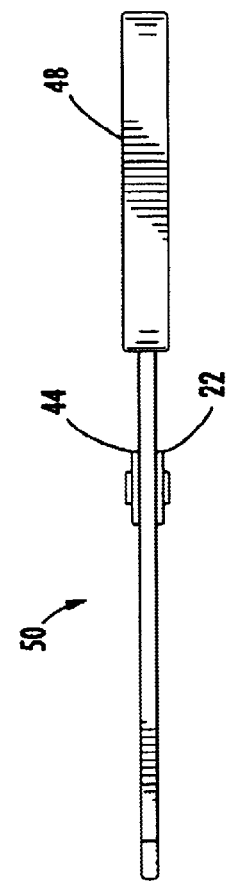

ASSEMBLY METHOD FOR VEHICLE ANTI-THEFT KEY WITH RESISTOR

FIELD OF THE INVENTION

The present invention relates generally to a method for making a key for a lock. More particularly, the present invention relates to a method for making keys for a motor vehicle ignition system that is secured by an electronic interlock.

BACKGROUND OF THE INVENTION

Various types of vehicle security systems have evolved as a way to inhibit, or at least deter, theft of automobiles. One such security system employs an ignition key having an embedded resistor pellet. The resistor pellet, as the name implies, incorporates an electrical resistor of known value. When the key is inserted into the automobile ignition slot and turned, electrical current flows through the resistor. Electronics within the ignition system measure the resistance value of the resistor contained in the resistor pellet and compare the measured resistance value to an expected resistance value. If the measured resistance value falls outside an acceptable resistance range, the vehicle engine cannot be started.

Manufacturing vehicle ignition keys with resistor pellets has proven to be challenging. Manufacturing techniques employed to date include use of adhesives, sonic welding, and swaging. However, the application of each of these techniques has proven problematic for various reasons.

Therefore, there is a need for a method of manufacturing keys with resistor pellets which overcomes problems associated with prior art assembly methods.

SUMMARY OF THE INVENTION

The present invention eliminates the difficulties and disadvantages of the prior art by providing a method for assembling an anti-theft key. In a preferred embodiment, the method includes providing a key blade defined by a shank portion (for being inserted into a vehicle ignition) and a handle portion. A through opening is formed in the shank portion of the key blade. A resistor pellet is also provided, the resistor pellet being configured to include an electrically insulative body having a first end including a flange with a perimeter larger than the perimeter of the through opening in the shank portion of the key blade. A second end of the insulative body has a perimeter smaller than the perimeter of the through opening. A resistor contained in the insulative body includes two electrical contact points with electrical conductors connected to each of the contact points and extending beyond the two ends of the insulative body. The second end of the resistor pellet insulative body is inserted through the through opening of the key blade shank portion such that the resistor pellet is loosely positioned within the through opening. With the resistor pellet in position, a second flange having a perimeter larger than the through opening of the key blade shank portion is attached to the second end of the insulative body, thereby capturing the resistor pellet within the through opening by the two flanges positioned on either side of the key blade.

Various methods for attaching the second flange to the second end of the insulative body may be employed in the practice of the invention. In a preferred embodiment, the second flange is formed in place by a polymeric molding process. The polymeric molding process may be implemented in various ways with injection molding being a particularly preferred method for thermoforming the second flange in place. If desired, the polymeric molding process employed to form the second flange may also be employed to form a handle adjacent the handle portion of the key blade substantially simultaneously with the forming of the second flange.

The above described resistor pellet may be further configured to include a lip adjacent the second end of the insulative body and extending beyond an outer surface of the key blade shank portion when the second end of the insulative body is fully inserted through the through opening. When the resistor pellet is configured in this manner, a gap is formed between the lip and the through opening. Polymeric material can then be injected into the gap during the polymeric molding process to provide superior attachment of the second flange once the material has hardened.

BRIEF DESCRIPTION OF THE DRAWINGS

Preferred embodiments of the invention will now be described in further detail. Other features, aspects, and advantages of the present invention will become better understood with regard to the following detailed description, appended claims, and accompanying drawings (which are not to scale) where:

FIG. 9 is a side view of key blade and resistor pellet shown in FIG. 6; and

FIG. 10 is a side view of the assembled anti-theft key shown in FIG. 8.

DETAILED DESCRIPTION OF THE PREFERRED EMBODIMENT(S)

Figure 1:
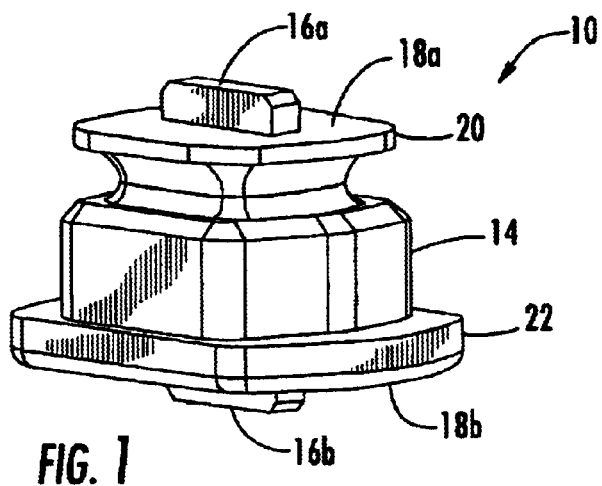
FIG. 1 is a perspective side view of a preferred embodiment of a resistor pellet for use in accordance with the invention.
Figure 2:
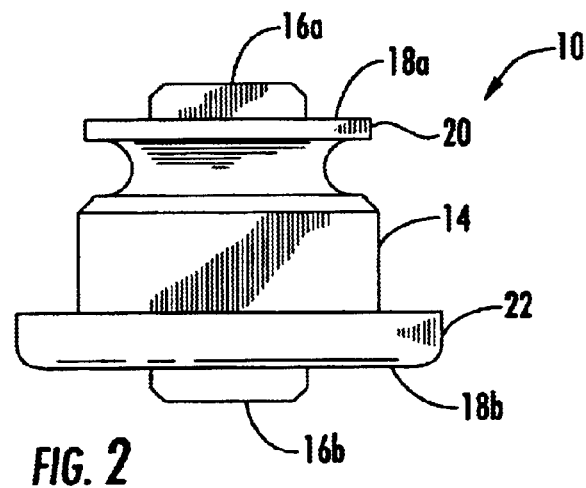
FIG. 2 is a side view of the resistor pellet of FIG. 1.
Figure 3:
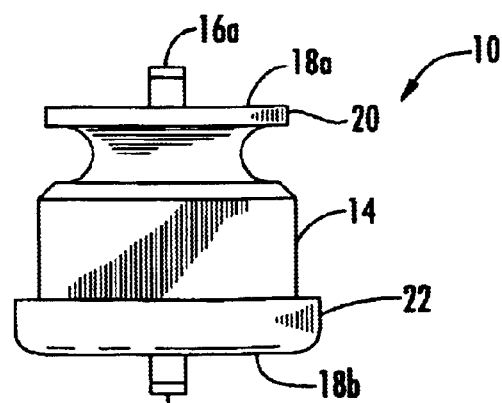
FIG. 3 is a front view of the resistor pellet of FIG. 1.
Figure 4:
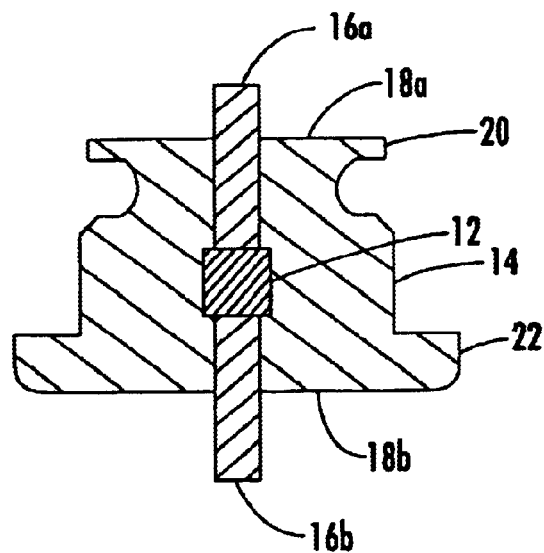
FIG. 4 is a cross-sectional view of the resistor pellet of FIG. 1.

With reference now to the drawings in which like reference characters designate like or similar parts throughout the several views, the present invention provides a method for assembling an anti-theft key with a resistor pellet for use in a Vehicle Anti-Theft Security (VATS) system or similar security system. A suitable VATS system which uses an ignition key with a resistor pellet is described in U.S. Pat. No. 5,083,362. Briefly, the ignition key is provided with a resistor pellet having a known resistance. When the key is inserted into the ignition slot and turned, circuitry within the ignition system applies an electrical current across the resistor carried by the pellet. The resistance value of the resistor pellet is measured and compared to an expected resistance value. If the measured resistance value is not within an acceptable tolerance of the expected value, the vehicle will not start.

FIGS. 1–4 provide various views of a resistor pellet 10 for use in the present invention. In a preferred embodiment of the pellet 10, the pellet 10 includes an electrical resistor 12 (FIG. 4) having a known resistance, an electrically insulative body 14 encapsulating the resistor 12, and electrical conductors 16a, 16b connected to the resistor 12 at contact points and extending beyond opposed ends 18a, 18b of the pellet 10. The pellet body 14 is fabricated from an electrically insulative material, such as a polymer or ceramic, and includes a lip at end 18a and a flange 22 at end 18b. The perimeter of the lip 20 is smaller than the perimeter of the flange 22, and the lip 20 is preferably thinner than the flange 22.

Figure 5:
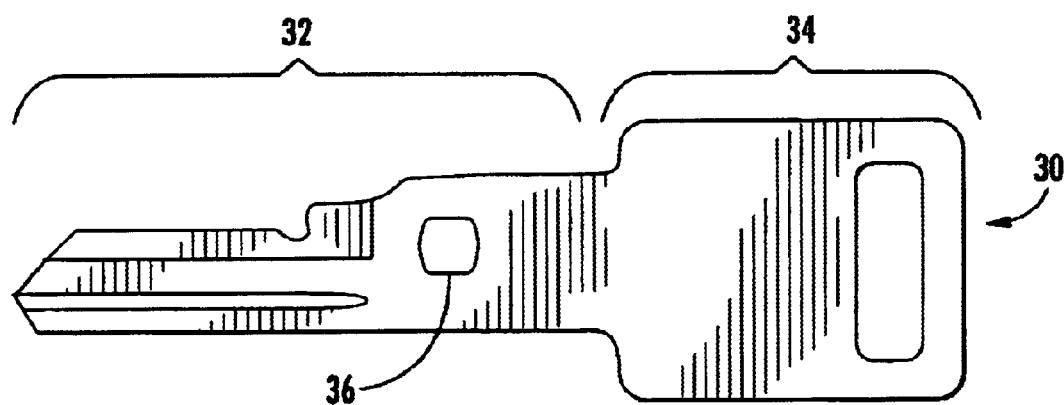
FIG. 5 is a top view of a preferred embodiment of a key blade for use in accordance with the invention, the key blade including a shank portion and a handle portion with a through opening formed in the shank portion.

FIG. 5 illustrates a preferred embodiment of a key blade 30 for use in the present invention. The key blade 30 includes a shank portion 32, a handle portion 34, and a through opening 36 formed in the shank portion 32. The resistor pellet 10 is permanently attached to the key blade 30 at the through opening 36. The through opening 36 is slightly larger than the perimeter of the pellet lip 20 to enable end 18a of the pellet 10 to be inserted through the through opening 36, as shown in FIG. 6, and loosely held within the through opening 36 during an early step in the assembly process which permanently attaches the pellet 10 to the key blade 30.

Figure 6:
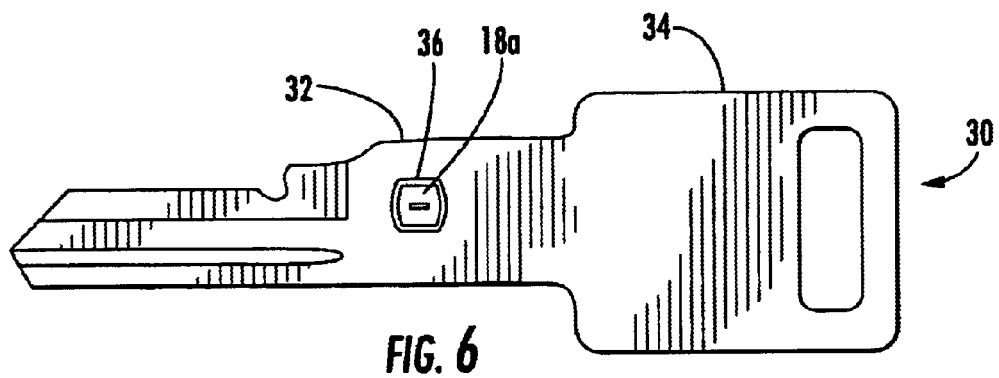
FIG. 6 is a top view of the key blade of FIG. 5 with the resistor pellet of FIG. 1 loosely positioned within the through opening of the shank portion.

Referring now to FIGS. 6 and 9, during attachment of the pellet 10 to the key blade 30, end 18a of the pellet 10 is inserted through the through opening 36 until end 18a extends slightly beyond surface 38 of the key blade 30 and the pellet flange 22 abuts surface 40 of the key blade 30. The perimeter of the pellet flange 22 is larger than the through opening 36 so as to prevent end 18b of the pellet 10 from entering the through opening 36. Preferably, the pellet lip 20 also extends slightly beyond surface 38 to form a gap 42 between the lip 20 and the through opening 36.

Figure 7:
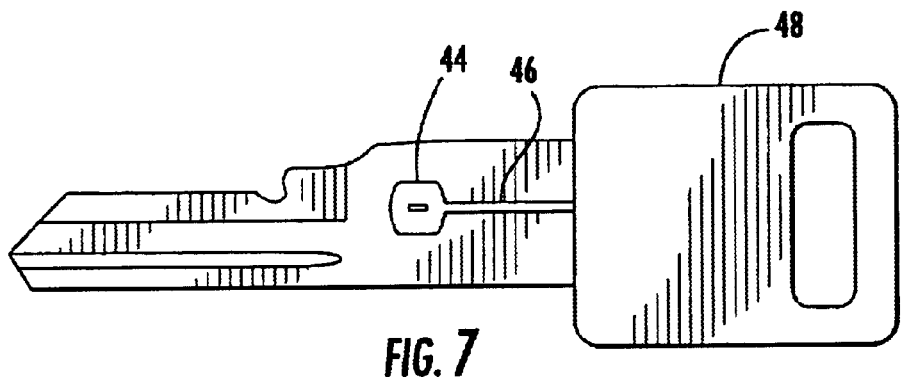
FIG. 7 is a top view of the key blade and resistor pellet of FIG. 5 after a polymer molding process is employed to capture the resistor pellet within the through opening formed in the shank portion of the key blade.

With the pellet 10 positioned as shown in FIGS. 6 and 9, a second flange 44 shown in FIG. 7 is attached to end 18a. Flange 44 has a perimeter which is larger than the through opening 36 so that the pellet 10 is captured within the through opening 36 by flanges 22, 44 and permanently attached to the key blade 30. Like the resistor pellet body 14, the second flange 44 is fabricated from an electrically insulative material so as not to interfere with the conduction of electrical current through the resistor 12 and conductors 16a, 16b when the assembled key is inserted into, for example, the ignition slot of a vehicle equipped with a VATS security system or similar security system.

Various manufacturing methods may be employed to attach flange 44 to end 18a of the resistor pellet 10. In a preferred embodiment, however, the key assembly process utilizes a polymeric molding process to attach the flange 44 to end 18a of the resistor pellet 10 by molding the flange 44 in place. In a preferred polymeric molding process, the flange 44 is thermoformed by injection molding the flange 44 from a polymeric material (such as polyester or nylon) with the aid of a die. An alternative polymeric molding process utilizes a thermoset process of forming the flange 44 in place.

As previously described with reference to FIG. 9, the pellet 10 is preferably configured so that the lip 20 extends slightly beyond surface 38 of the key blade 30 when the pellet 10 is fully inserted into the through opening 36. The resulting gap 42 between the lip 20 and through opening 36 enables the polymeric material forming the flange 44 to flow beneath the lip 20 during the molding process to provide superior attachment of the flange 44 when the material has hardened.

Figure 8:
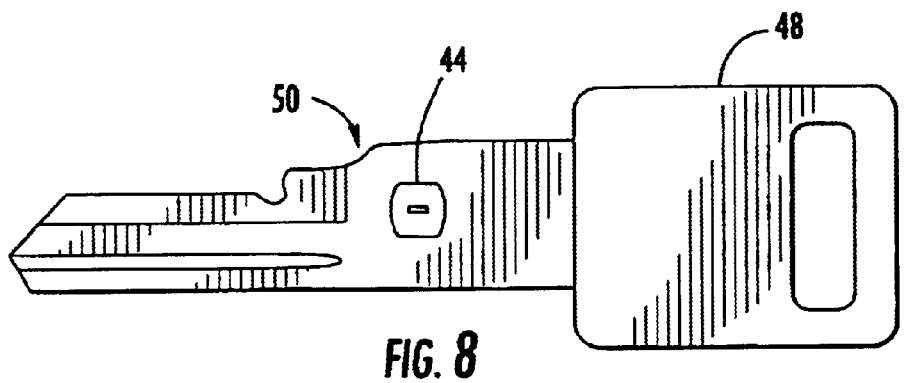
FIG. 8 is a top view of an anti-theft key assembled in accordance with the invention.

During the polymeric molding process which forms the flange 44, a key handle 48 is preferably formed substantially simultaneously using the same polymeric molding process which forms the flange 44. In one configuration of an injection molding die, the polymeric molding process employs an injection molding die with separate die chambers for the handle 48 and flange 44 with the chambers interconnected by a channel so that a single injection port can be efficiently utilized to inject material into both chambers. Use of such a die produces a runner 46 (formed by the channel interconnecting the two die chambers) which is formed along surface 38 of the key blade shank portion. The runner 46 interconnects the flange 44 with the handle 48 as shown in FIG. 7. The runner 46, being excess material formed during the molding process, is trimmed and removed to complete the assembled key 50 as shown in FIGS. 8 and 10. The trimmed material can be re-used on site so that little if any scrap material is created by the assembly process. In an alternate configuration of an injection molding die, the die chambers which form the flange 44 and handle 48 are not interconnected.

It will be appreciated that an anti-theft key assembly process in accordance with the invention described herein provides a highly efficient and effective way of mass producing the keys. Labor and material costs are significantly less than other methods previously employed.

While the invention has been described in detail, it is to be expressly understood that it will be apparent to persons skilled in the relevant art that the invention may be modified without departing from the spirit of the invention. Various changes of form, design or arrangement may be made to the invention without departing from the spirit and scope of the invention. Therefore, the above mentioned description is to be considered exemplary, rather than limiting, and the true scope of the invention is that defined in the following claims.

What is claimed is:

1. A method for assembling an anti-theft key, the method comprising:
   providing a key blade defined by:
      a shank portion for being inserted into a vehicle ignition, said shank portion including a through opening; and
      a handle portion;
   providing a resistor pellet defined by:
      an electrically insulative body having:
         a first end including a first flange having a perimeter larger than the perimeter of said through opening; and
         a second end having a perimeter smaller than the perimeter of said through opening;
      a resistor contained in said insulative body and having first and second electrical contact points;
      a first electrical conductor connected to the first electrical contact point of the resistor and extending beyond the first end of the insulative body; and
      a second electrical conductor connected to the second electrical contact point of the resistor and extending beyond the second end of the insulative body;
   inserting the second end of the insulative body through said through opening so that the resistor pellet is loosely positioned within the through opening; and attaching a second flange adjacent the second end of the insulative body by forming the second flange in place by a polymeric molding process, said second flange having a perimeter larger than the perimeter of said through opening such that said resistor pellet is captured within the through opening by said first and second flanges.

2. The method of claim 1, further comprising:

providing a lip adjacent the second end of the insulative body which extends beyond an outer surface of the key blade shank portion when the second end of the insulative body is inserted through said through opening, forming a gap between said lip and said through opening; and injecting polymeric material into said gap during said polymeric molding process.

3. The method of claim 1 wherein the second flange is injection molded.

4. The method of claim 1, further comprising attaching a handle adjacent the handle portion of the key shank.

5. The method of claim 4 wherein said second flange and said handle are formed in place substantially simultaneously during a single injection molding step.

6. The method of claim 5 wherein said second flange and said handle are formed with a polymer material.

7. The method of claim 5 wherein said second flange and said handle are formed with nylon.

8. The method of claim 5, further comprising removing excess material formed between the second flange and the handle during said single injection molding step.

9. A method for assembling an anti-theft key, the method comprising:

providing a key blade defined by:
   a shank portion for being inserted into a vehicle ignition, said shank portion including a through opening; and
   a handle portion;

providing a resistor pellet defined by:
   an electrically insulative body having:
      a first end including a first flange having a perimeter larger than the perimeter of said through opening; and
      a second end having a perimeter smaller than the perimeter of said through opening and being configured for attachment to a second flange by a polymeric molding process;
   a resistor contained in said insulative body and having first and second electrical contact points;
   a first electrical conductor connected to the first electrical contact point of the resistor and extending beyond the first end of the insulative body; and
   a second electrical conductor connected to the second electrical contact point of the resistor and extending beyond the second end of the insulative body;

inserting the second end of the insulative body trough said through opening so that the resistor pellet is loosely positioned within the through opening;

attaching a second flange adjacent the second end of the insulative body, said second flange having a perimeter larger than the perimeter of said through opening such that said resistor pellet is captured within the through opening by said first and second flanges; and attaching a handle adjacent the handle portion of the key shank wherein said second flange and said handle are formed in place substantially simultaneously by a polymeric molding process.

10. The method of claim 9, further comprising:

providing a lip adjacent the second end of the insulative body which extends beyond an outer surface of the key blade shank portion when the second end of the insulative body is inserted through said through opening, forming a gap between said lip and said though opening; and injecting polymeric material into said gap during said polymeric molding process.

11. The method of claim 9, further comprising removing excess material formed between the second flange and the handle during said polymeric molding process.

12. A method for assembling a vehicle anti-theft key, the method comprising:

providing a key blade defined by:
   a shank portion for being inserted into a vehicle ignition, said shank portion including a through opening; and
   a handle portion;

providing a resistor pellet defined by:
   an electrically insulative body having:
      a first end including a first flange having a perimeter larger than the perimeter of said through opening; and
      a second end having a perimeter smaller than the perimeter of said through opening;
   a resistor contained in said insulative body and having first and second electrical contact points;
   a first electrical conductor connected to the first electrical contact point of the resistor and extending beyond the first end of the insulative body; and
   a second electrical conductor connected to the second electrical contact point of the resistor and extending beyond the second end of the insulative body;

inserting the second end of the insulative body through said through opening so that the resistor pellet is loosely positioned within the through opening;

forming a second flange adjacent the second end of the insulative body, said second flange having a perimeter larger than the perimeter of said through opening such that said resistor pellet is captured within the through opening by said first and second flanges;

forming a handle adjacent the handle portion of the key shank;

wherein said second flange and said handle are fanned during a single polymeric molding process; and removing excess material formed between the second flange and the handle during said polymeric molding process.

* * * * *